(12) United States Patent
Li

(10) Patent No.: US 7,469,627 B2
(45) Date of Patent: Dec. 30, 2008

(54) COFFEE MAKER

(75) Inventor: Zhiping Li, Kaifeng (CN)

(73) Assignee: Chi Kin John Mak, Hong Kong (HK)

( * ) Notice: Subject to any disclaimer, the term of this patent is extended or adjusted under 35 U.S.C. 154(b) by 136 days.

(21) Appl. No.: 11/545,445

(22) Filed: Oct. 11, 2006

(65) Prior Publication Data

US 2007/0079708 A1    Apr. 12, 2007

Related U.S. Application Data

(60) Provisional application No. 60/724,872, filed on Oct. 11, 2005.

(51) Int. Cl.
*A47J 31/00* (2006.01)
(52) U.S. Cl. .............................. 99/286; 99/287; 99/295
(58) Field of Classification Search ........... 99/279–323, 99/452–455, 275, 323.1, 323.2
See application file for complete search history.

(56) References Cited

U.S. PATENT DOCUMENTS

| | | | |
|---|---|---|---|
| 1,789,334 A | 1/1931 | Englung | |
| 2,517,073 A | 8/1950 | Alvarez | |
| 3,812,773 A | 5/1974 | Hultsch | |
| 3,967,546 A | 7/1976 | Cailliot | |
| 4,007,675 A * | 2/1977 | Cailliot et al. | 99/286 |
| 4,074,621 A | 2/1978 | Cailliot | |
| 4,641,572 A | 2/1987 | Varga | |
| 4,706,555 A | 11/1987 | Nakamura et al. | |
| 4,841,849 A | 6/1989 | Shimomura et al. | |
| 4,895,308 A | 1/1990 | Tanaka | |
| 4,962,693 A | 10/1990 | Miwa et al. | |
| 5,463,932 A | 11/1995 | Olson | |
| 5,566,605 A | 10/1996 | Lebrun et al. | |
| 6,095,032 A * | 8/2000 | Barnett et al. | 99/286 |
| 6,227,102 B1 * | 5/2001 | Sham et al. | 99/286 |
| 6,439,106 B1 * | 8/2002 | Sham et al. | 99/286 |
| 6,532,862 B2 | 3/2003 | Mork et al. | |
| 2002/0014161 A1 | 2/2002 | Mork et al. | |
| 2004/0231522 A1 | 11/2004 | Burrows et al. | |

OTHER PUBLICATIONS

Int'l Search Report and Written Opinion in connection with the corresponding PCT application.

* cited by examiner

*Primary Examiner*—Timothy F. Simone

(57) ABSTRACT

A coffee maker with combined milling stage and brewing stage is provided. The coffee maker includes a shaft, a brewing basket, a chopping blade and a locking mechanism. The shaft includes a longitudinal axis and is capable of being rotated about the axis. The brewing basket is adapted to receive coffee beans and hot water. The brewing basket includes a sleeve. A portion of the shaft is movably fitted within the sleeve. The brewing basket is capable of being rotated about the axis. The chopping blade is attached to an end of the shaft and positioned within the brewing basket. The locking mechanism is adapted to lock the brewing basket and unlock the brewing basket. When the brewing basket is locked, rotation of the shaft drives the chopping blade to rotate about the axis to mill the coffee beans to produce milled coffee powder. When the brewing basket is unlocked, rotation of the shaft generates frictional forces on the brewing basket to drive the brewing basket to rotate to generate centrifugal forces, causing the hot water to penetrate the milled coffee powder to produce brewed coffee.

20 Claims, 7 Drawing Sheets

Coffee Powder

| Coffee Cups | Milling Setting | | |
|---|---|---|---|
| | Mild | Medium | Strong |
| 8 cups |  |  |  |
| 4 cups |  |  |  |
| 2 cups |  |  |  |

30 - 32 g   Beans for 8 cups Coffee
20 - 24 g   Beans for 4 cups Coffee
10 - 12 g   Beans for 2 cups Coffee

COFFEE MAKER

RELATED APPLICATION

This application claims the benefit of U.S. Provisional Patent Application Ser. No. 60/724,872, filed Oct. 11, 2005, which is incorporated by reference herein in its entirety.

FIELD OF THE INVENTION

The present invention relates to a coffee maker and, in particular, to a centrifugal type coffee maker combining both coffee milling and brewing in one chamber.

BACKGROUND OF THE INVENTION

In the market, many coffee makers claiming to have both milling and brewing functions simply pack a motorized coffee mill and a regular coffee maker together under one roof. Coffee beans are being milled and brewed in separated chambers. Some coffee makers do provide a built-in channel to transfer milled coffee powder from the milling chamber to the brewing chamber. However, the channel connecting the two chambers is hidden and is not accessible to be cleaned, which creates a hygiene issue.

The coffee maker of the type described above is disclosed in U.S. Pat. No. 4,962,693. In the coffee maker, a chopping blade and a brewing basket are mounted together to provide milling and brewing in one chamber. The chopping blade is driven by a motor all the time, while the brewing basket is driven by the chopping blade, which depends on a clutch mechanism. The clutch mechanism has a coil spring which engages or disengages the brewing basket from the chopping blade depending on the rotational direction of motor.

The clutch design is complicated and ends up the accumulated mechanical tolerance which creates misalignment between the brewing basket, chopping blade and motor. As such, when the brewing basket is rotated at a high speed, an intense oscillation and a big noise will be generated.

Using this coffee maker, hot water must be added to the coffee powder before the motor starts to wet all coffee powder thoroughly, in order to provide an even load distribution inside the brewing basket to end up less vibration and noise during brewing. However, the timing to wet all coffee powder varies with many uncontrollable factors, such as the amount of powder, size of powder, nature of the coffee. If the timing is too short, a mixture of un-wetted and wetted coffee powder lumps is generated, which creates an uneven load distribution. If the timing is too long, the hot water stays with the coffee powder for long time, which makes the coffee bitter.

Using this coffee maker, centrifugal force drives the permeated coffee powder to the top of the brewing basket where a filter paper is installed. Brewed coffee is filtered out through the filter paper and falls into a collector tray outside the basket. The filtration area is small and is not effective for filtering. When the speed of filtration of brewed coffee is slower than the speed of feeding the hot water, the hot water stays with the coffee powder before being filtered out. Consequently, there is a potential problem of overflow.

SUMMARY

A coffee maker with combined milling stage and brewing stage is provided. In one aspect, the coffee maker includes a shaft, a brewing basket, a chopping blade and a locking mechanism. The shaft includes a longitudinal axis and is capable of being rotated about the axis. The brewing basket is adapted to receive coffee beans and hot water. The brewing basket includes a sleeve, and a portion of the shaft is movably fitted within the sleeve. The brewing basket is capable of being rotated about the axis. The chopping blade is attached to an end of the shaft and positioned within the brewing basket. The locking mechanism is adapted to lock the brewing basket or unlock the brewing basket. When the brewing basket is locked, rotation of the shaft drives the chopping blade to rotate about the axis to mill the coffee beans to produce milled coffee powder. When the brewing basket is unlocked, rotation of the shaft generates frictional forces on the brewing basket to drive the brewing basket to rotate to generate centrifugal forces, causing the hot water to penetrate the milled coffee powder to produce brewed coffee.

In one embodiment, the coffee maker includes a filter positioned within the brewing basket. The filter defines therein a chamber enclosing the chopping blade and adapted to receive the coffee beans.

In an alternative embodiment, the side wall of the brewing basket includes an outer filter. An inner filter is positioned in a concentric relationship with the outer filter in the brewing basket. The inner filter includes a layer of plate with a plurality of apertures, while the outer filter includes a layer of wire mesh.

In one embodiment, at least a bushing is positioned between the sleeve and the shaft.

In one embodiment, the brewing basket has a downwardly tapered inner surface.

In one embodiment, the coffee maker includes a controller adapted to command the locking mechanism to lock the brewing basket during the milling stage and to unlock the brewing basket during the brewing stage.

In one embodiment, the coffee maker includes a controller adapted to control duration of the milling stage to produce different grain sizes of the milled coffee powder to make the brewed coffee with different flavors.

In one embodiment, the coffee maker includes a controller adapted to control rotational speed of the brewing basket during the brewing stage to attain different water penetration speeds through the milled coffee powder to make the brewed coffee with different flavors.

In another aspect, the coffee maker includes a shaft, a chopping blade and a brewing basket. The shaft includes a longitudinal axis and is capable of being rotated about the axis. The chopping blade is attached to an end of the shaft. During the milling stage, the rotation of the shaft drives the chopping blade to rotate about the axis to mill coffee beans to produce milled coffee powder. The brewing basket encloses the chopping blade and is adapted to receive the coffee beans and hot water. The brewing basket includes a sleeve, and a portion of the shaft in movably fitted within the sleeve. The brewing basket is capable of being rotated about the axis. During the brewing stage, the rotation of the shaft generates frictional forces on the brewing basket to drive the brewing basket to rotate to generate centrifugal forces, causing the hot water to penetrate the milled coffee powder to produce brewed coffee.

In one embodiment, the coffee maker includes a filter positioned within the brewing basket. The filter defines therein a chamber enclosing the chopping blade and adapted to receive the coffee beans.

In an alternative embodiment, the side wall of the brewing basket includes an outer filter. An inner filter is positioned in a concentric relationship with the outer filter in the brewing basket. The inner filter includes a layer of plate with a plurality of apertures, while the outer filter includes a layer of wire mesh.

In one embodiment, at least a bushing is positioned between the sleeve and the shaft.

In one embodiment, the brewing basket has a downwardly tapered inner surface.

In one embodiment, the brewing basket is free from rotating during the milling stage, but rotates during the brewing stage.

In one embodiment, the coffee maker includes a controller adapted to control duration of the milling stage to produce different grain sizes of the milled coffee powder to make the brewed coffee with different flavors.

In one embodiment, the coffee maker includes a controller adapted to control rotational speed of the brewing basket during the brewing stage to attain different water penetration speeds through the milled coffee powder to make the brewed coffee with different flavors.

In yet another aspect, the coffee maker includes a shaft, a brewing basket, a chopping blade and a controller. The shaft includes a longitudinal axis and is capable of being rotated about the axis. The brewing basket is adapted to receive coffee beans and hot water. The brewing basket includes a sleeve, and a portion of the shaft is movably fitted within the sleeve. The brewing basket is capable of being rotated about the axis. The chopping blade is attached to an end of the shaft and positioned within the brewing basket. The controller is adapted to control sequence of the milling stage and the brewing stage. During the milling stage, rotation of the shaft drives the chopping blade to rotate about the axis to mill the coffee beans to produce milled coffee powder. During the brewing stage, rotation of the shaft generates frictional forces on the brewing basket to drive the brewing basket to rotate to generate centrifugal forces, causing the hot water to penetrate the milled coffee powder to produce brewed coffee.

BRIEF DESCRIPTION OF THE DRAWINGS

FIG. 1b is an enlarged cross-sectional view showing the milling and brewing mechanism of the coffee maker of FIG. 1a.

FIG. 1c shows a locking mechanism and a brewing basket of the coffee maker of FIG. 1a.

DETAILED DESCRIPTION

Reference will now be made in detail to exemplary embodiments, examples of which are also provided in the following description. It will be apparent to those skilled in the relevant art that some features that are not particularly important to an understanding of the invention may not be shown for the sake of clarity.

Furthermore, it should be understood that the invention is not limited to the precise embodiments described below and that various changes and modifications thereof may be effected by one skilled in the art without departing from the spirit or scope of the invention. For example, elements and/or features of different illustrative embodiments may be combined with each other and/or substituted for each other within the scope of this disclosure and appended claims.

In addition, improvements and modifications which may become apparent to persons of ordinary skill in the art after reading this disclosure, the drawings, and the appended claims are deemed within the spirit and scope of the present invention.

Figure 1A:
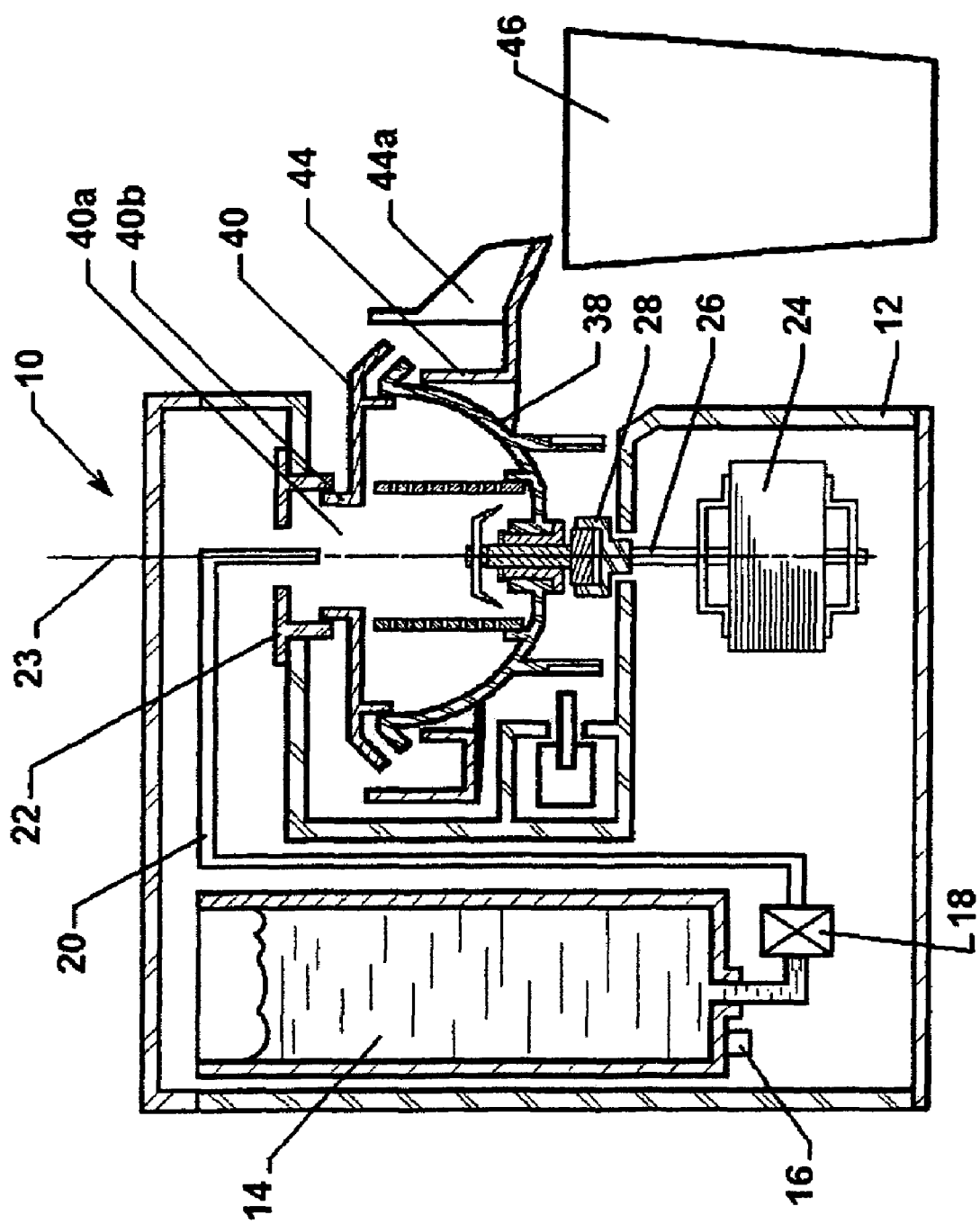
FIG. 1a is a cross-sectional view of an embodiment of a coffee maker.

Referring now to FIG. 1a of the drawings, a cross-sectional view of an embodiment of a coffee maker 10 is shown. The coffee maker 10 includes a base 12, such that the coffer maker 10 can be placed on a table or a counter. A water reservoir 14 may be disposed on a side of the chamber of the base 12 and a heater 16 may be provided at the bottom of the water reservoir 14. A water pump 18 and a water tube 20 may be provided to pump boiled water from the reservoir 14 to the water tube 20. An electric motor 24 of a vertical shaft type may be provided inside the chamber of the base 12. A coupler 28 may be mounted at an upper end of a rotational shaft 26 of the motor 24.

In the illustrated embodiment, a brewing basket 38 is provided on top of the base 12. The brewing basket 38 has an upper opening covered by a lid 40. The lid 40 has an opening 40a through which the hot water can fall down into the brewing basket 38. A space or gap (e.g., 1 mm) may be left between the brewing basket 38 and the lid 40. In this embodiment, the basket 38 have a downwardly tapered inner surface, so that the centrifugal forces generated by the rotation of the brewing basket 38 can cause brewed coffee to rise toward the gap and flow out of the basket 38. A ring 40b extending from the top of the lid 40 may be provided to couple with a bearing 22 located above the brewing basket 38. The bearing 22 and the coupler 28 can hold the brewing basket 38 and lid 40 concentrically in alignment with the rotational axis 23 of the motor 24.

A collector tray 44 may be detachably provided around the top peripheral edge of the brewing basket 38 to collect brewed coffee coming out from the top of the basket 38. The bottom of the collector tray 44 may be slanted towards one side to divert all brewed coffee to that side. The outlet 44a may be formed at the lowest point of the slanted bottom. When putting a receiver 46 underneath the outlet 44a, brewed coffee flows into the receiver 46 for serving.

Figure 1B:
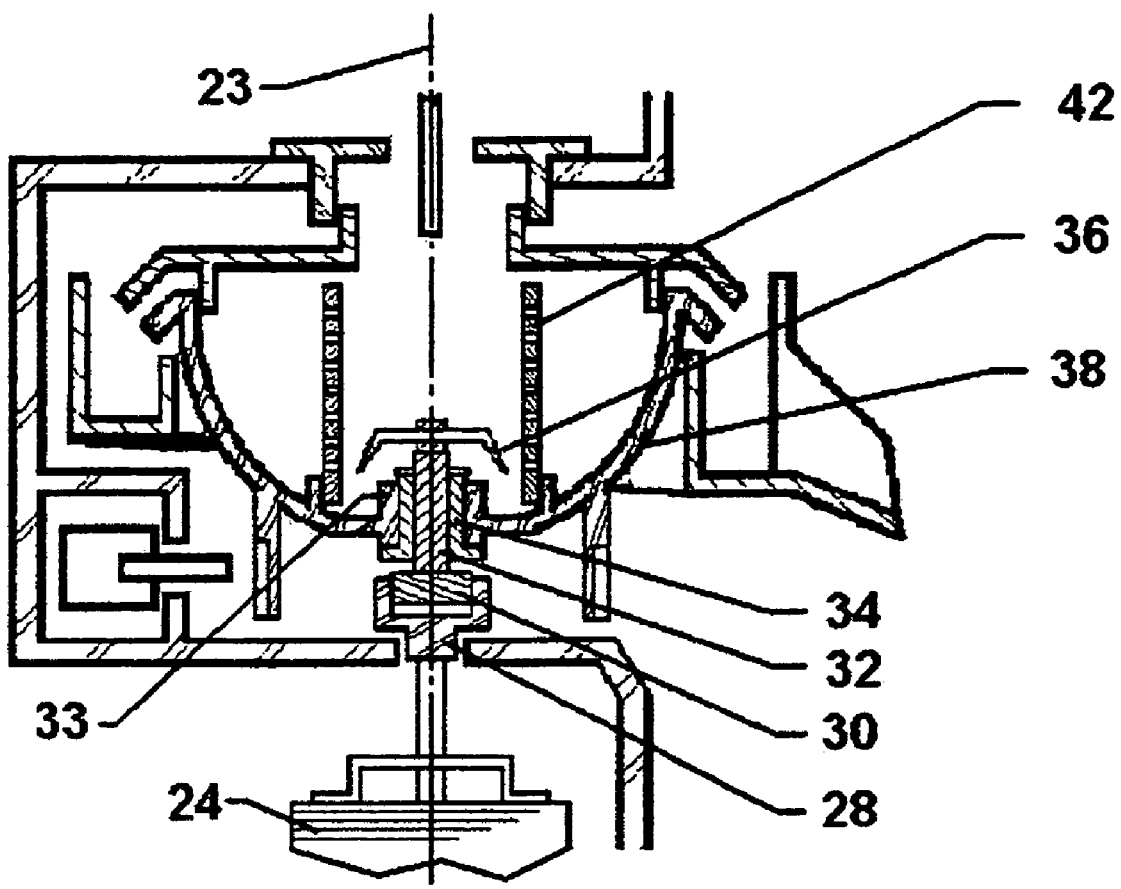

Referring now to FIG. 1b, a shaft 32 is provided at the bottom center of the brewing basket 38. The shaft 32 has a longitudinal axis 23 and is capable of being rotated about the axis 23.

A chopping blade 36 is attached to the upper end of the shaft 32. The lower end of shaft 32 may be provided with a coupler 30 which engages with another coupler 28, such that the rotation of motor 24 can be transmitted to the chopping blade 36 and the brewing basket 38. The brewing basket 38 includes a sleeve 33 at its bottom. In one embodiment, a portion of the shaft 32 is movably fitted within the sleeve 33, such that the shaft 32 and the brewing basket 38 have a relative rotational relationship. In another embodiment, a bushing 34 may be provided between the shaft 32 and sleeve 33 of the brewing basket 38 to minimize the wearing when relative rotation happens between the shaft 32 and the brewing basket 38.

In the illustrated embodiment, the bushing 34 is fixedly fitted with the brewing basket 38, and the shaft 32 is movably fitted within the bushing 34. Consequently, when the brewing basket 38 is locked in place, the shaft 32 and the chopping blade 36 can be driven by the motor 24 through the couplers 28 and 30 to mill the coffee beans. However, when the brewing basket 38 is unlocked and the shaft 32 is rotating, frictional forces generated on the inner surface of the bushing 34 drive the bushing 34 and the brewing basket 38 to rotate corresponding to the rotation of the shaft 32. However, the rotational speed of the bushing 34 and the brewing basket 38 is always slower than that of the shaft 32. As a result, a relative motion is generated between the brewing basket 38 and the shaft 32.

The rotational speed of the brewing basket 38 increases gradually until a steady rotational speed is reached. The difference between the rotational speed of the brewing basket 38 and the rotational speed of the shaft 32 depends on the frictional forces on the inner surface of the bushing. The larger the frictional forces are, the closer the rotational speed of the shaft 32 is.

The frictional forces generated on the inner surface of the bushing 34 depend on a number of factors, such as the materials of the shaft 32 and the bushing 34, the roughness of the inner surface of the bushing 34 and the outer surface of the shaft 32, the dimensions of the contacting area between the bushing 34 and the shaft 32, etc. The shaft 32 and the bushing 34 are generally made of durable materials, such as stainless steel, hard plastic, etc. The materials of the shaft 32 and the bushing 34 can be same or different.

In another embodiment, the shaft 32 can be fixedly fitted within the bushing 34, and the bushing 34 is movably fitted within the sleeve 33. In yet another embodiment, two or more bushings are provided between the shaft 32 and the bushing 34. The bushings are positioned in a concentric relationship.

A filter 42 can be placed inside the brewing basket 38 and positioned around the chopping blade 36 to form a chamber adapted to hold the coffee beans for milling and brewing. In the illustrated embodiment, the shape of the filter 42 is tubular. The filter 42 can be built with a layer of wire-mesh and is detachable from the brewing basket 38 for cleaning.

Figure 1C:
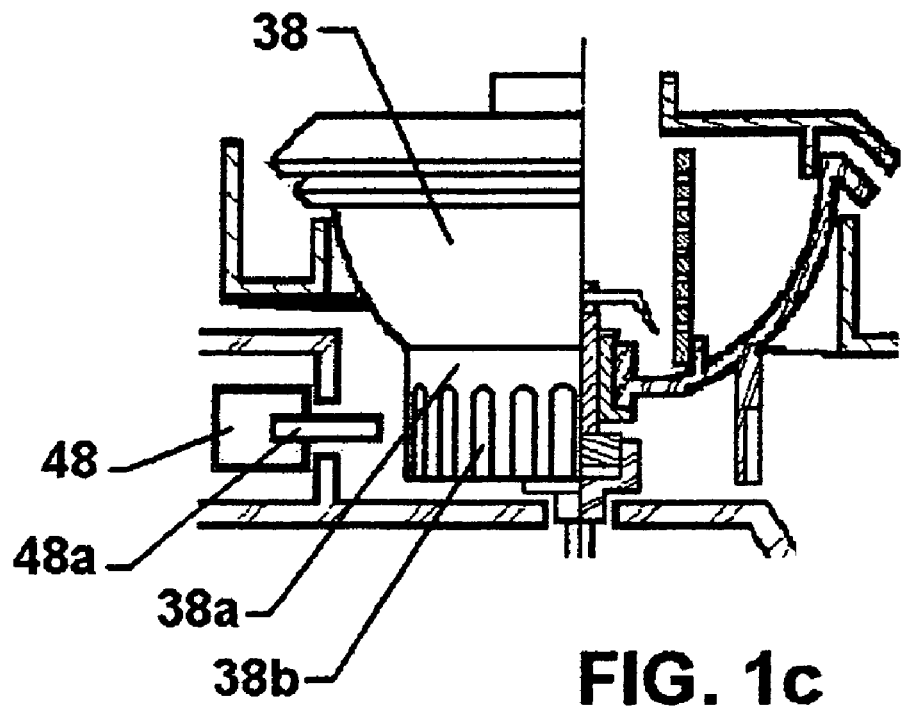

Referring to FIG. 1c, a locking mechanism 48 may be provided next to the bottom of the brewing basket 38. In the illustrated embodiment, the locking mechanism 48 includes a pin 48a, which may be controlled to be pushed out of or pulled into the locking mechanism 48. A ring 38a extends from the bottom of brewing basket 38 and carries embossed slots 38b on its surface. When the pin 48a is pushed out of the locking mechanism 48, it stops on the surface of the ring 38a. When the brewing basket 38 rotates slowly, the pin 48a falls into one of the embossed slots 38b and stops the rotation of the brewing basket 38. When the pin 48a is pulled into the locking mechanism 48, the pin 48a leaves the embossed slot 38b and the ring 38a. Consequently, the brewing basket 38 is free to rotate. Although the locking mechanism 48 and embossed slot 38b have been depicted in the drawing and described herein, it is to be understood that other mechanisms may be used to lock and unlock the brewing basket 38.

Figure 2:
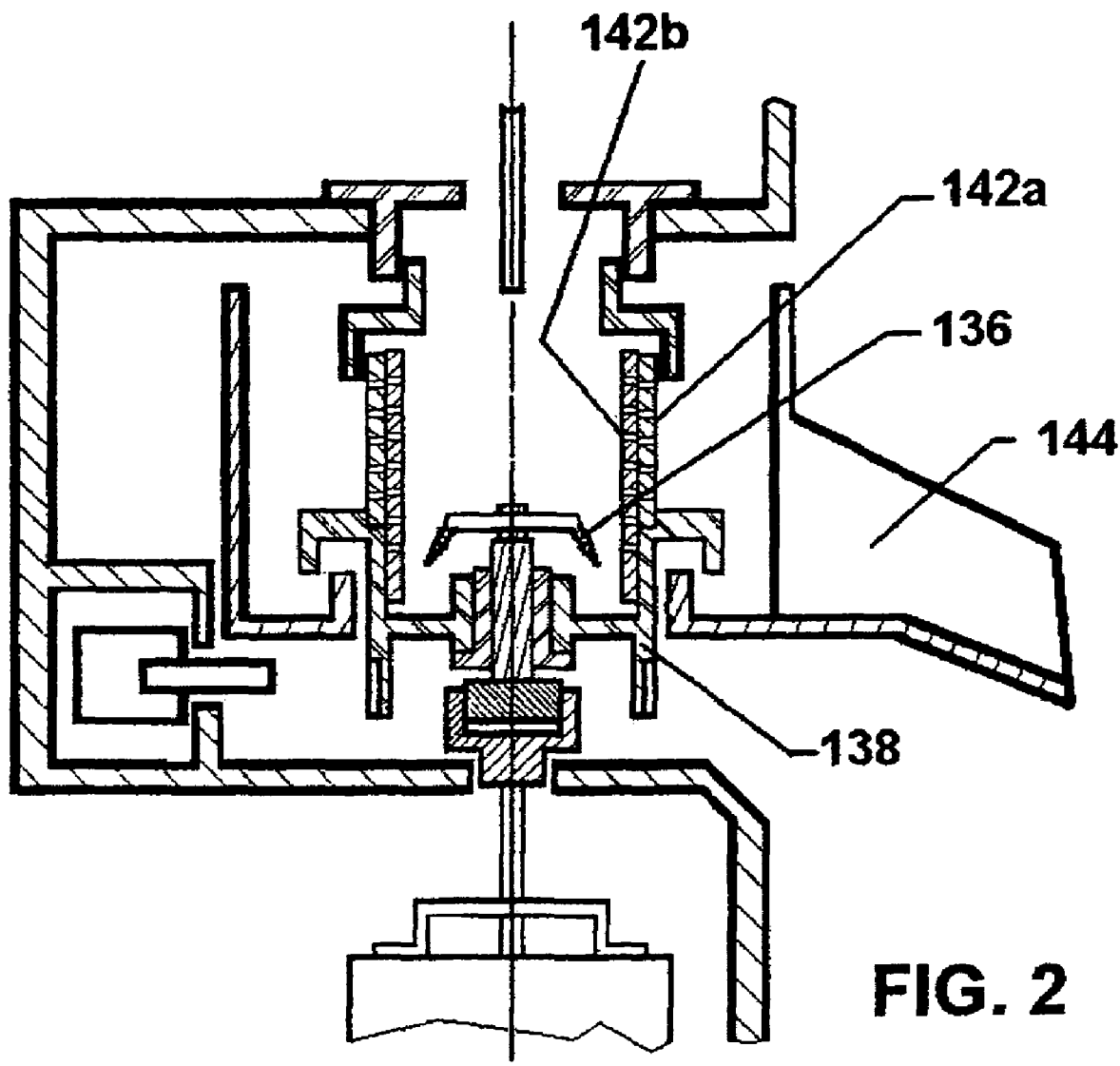
FIG. 2 is a cross-sectional view showing the milling and brewing mechanism of another embodiment of a coffee maker.

Referring now to FIG. 2, another embodiment of a coffee maker is illustrated. Different than the embodiment shown in FIGS. 1a-1c, in the illustrated embodiment, two filters, namely an outer filter 142a and an inner filter 142b, are utilized. The outer filter 142a forms a portion of the wall of the brewing basket 138. The inner filter 142b is placed inside the outer filter 142a and positioned around the chopping blade 136. The outer filter 142a and the inner filter 142b form a chamber adapted to hold the coffee beans for milling and brewing. The outer filter 142a and the inner filter 142b are detachable for cleaning and are positioned in a concentric relationship where the outer surface of the inner filter 142b may be in contact with the inner surface of the outer filter 142a.

In the illustrated embodiment, the inner filter 142b can be built with a layer of plate with a plurality of apertures. The plate can be made of durable material such as stainless steel. Since the plate made of durable material is more robust to be washed and cleaned, milled coffee powder trapped in the apertures can be easily wiped off. The outer filter 142a can be built with a layer of wire-mesh. Since major amount of milled coffee powder was trapped on the inner filter 142b, only small amount of coffee powder falls upon the outer filter 142a. Accordingly, the outer filter 142a can be easily cleaned by washing or flushing.

Optionally, a piece of filtration paper can be placed between the outer filter 142a and the inner filter 142b. The filtration paper can enhance the effectiveness of the filtration process. In addition, using the filtration paper, the outer filter 142a is much easier to be cleaned.

Although the outer filter 142a and the inner filter 142b have been depicted in the drawing and described herein, it is to be understood that the embodiment shown in FIG. 2 can have only one filter. It is to be understood that the outer and inner filters can also be used with the embodiment shown in FIGS. 1a-1c.

Although it has been described and depicted in FIGS. 1b and 2 that the filters are in the shape of a tubular, it is understood by one skilled in the art that the filters may be in any other appropriate shapes and configurations, including but not limit to cylinder with tapering sidewall, cone or cylinder with pleated sidewall, truncated cone, or truncated dome shape.

Figure 3A:
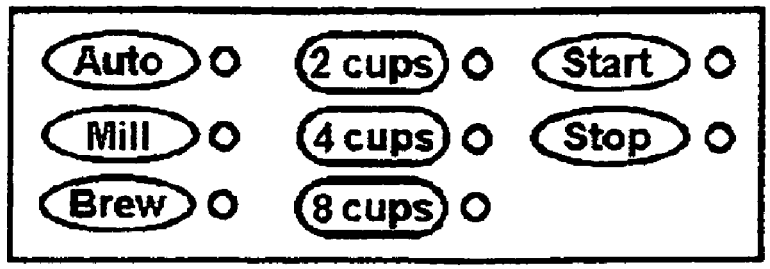
FIG. 3a shows a control panel of the coffee maker of FIG. 1a or FIG. 2.
Figure 3B:
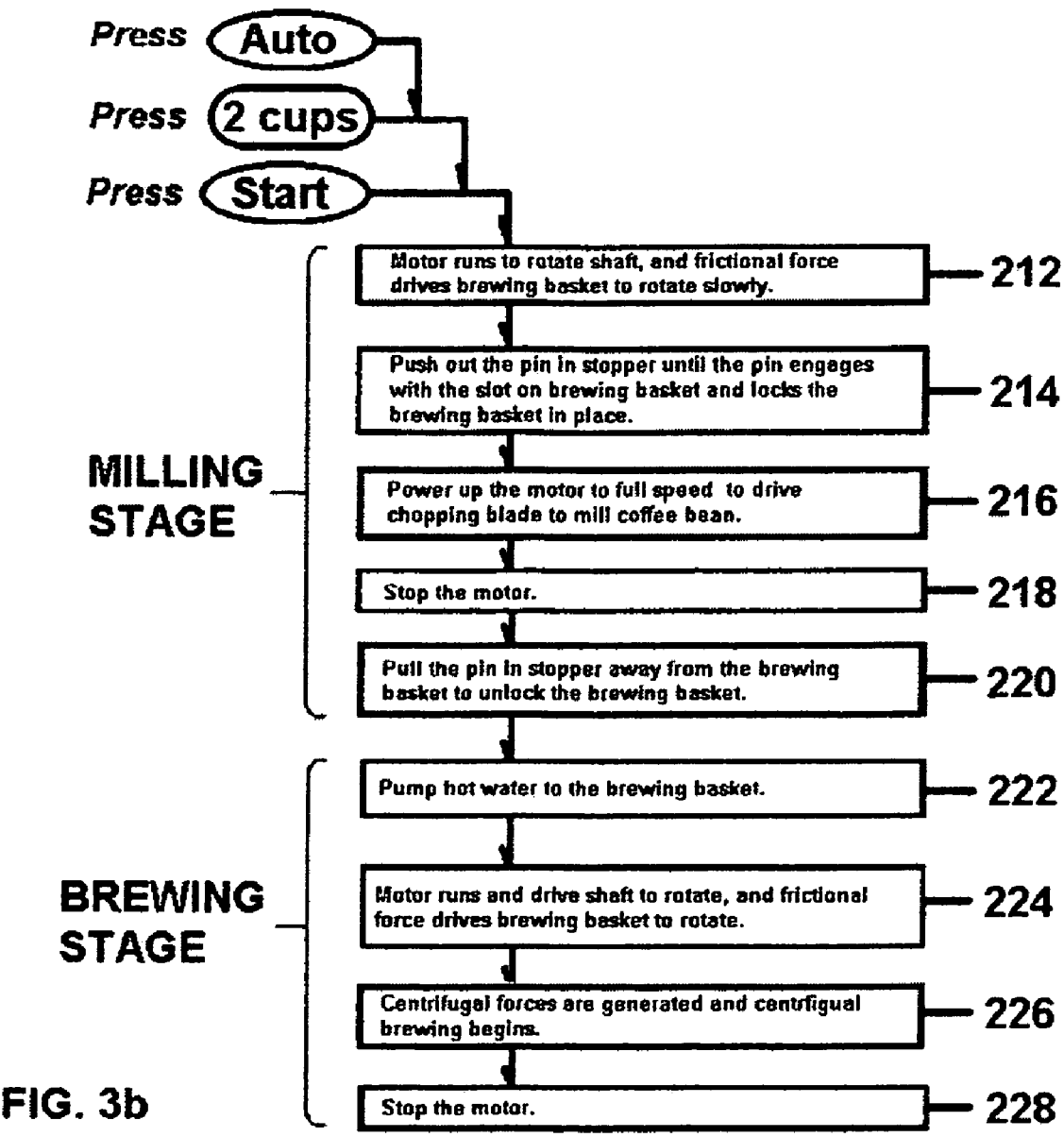
FIG. 3b is a flowchart showing the logic of the control panel of FIG. 3a for controlling the coffee making process.

FIG. 3a illustrates a control panel of the coffee makers described above, which is adapted to control the sequence of making coffee by a controller. The control panel can allow the user to activate both the milling stage and the brewing stage by pressing the "Auto" button. FIG. 3b is a flowchart showing the logic of the control panel.

Referring to FIGS. 3b and 4a-4d, when pressing the "Auto" button to start the milling stage and the brewing stage, the motor 24 is powered to run at about 5000 to about 10,000 rpm, preferably at about 8,000 rpm, to rotate the shaft 32. The brewing basket 38 is slowly rotated by the frictional forces generated on the bushing 34 (step 212). The pin 48a of the locking mechanism 48 is pushed out towards the ring 38a at the bottom of the brewing basket 38. When the pin 48a engages with one of the slots 38b, the brewing basket 38 is locked in place and stopped to rotate (step 214). The engagement of the pin 48a and slot 38b can be detected by the travel distance or relative position of the pin 48a inside the locking mechanism 48.

Figure 4A:
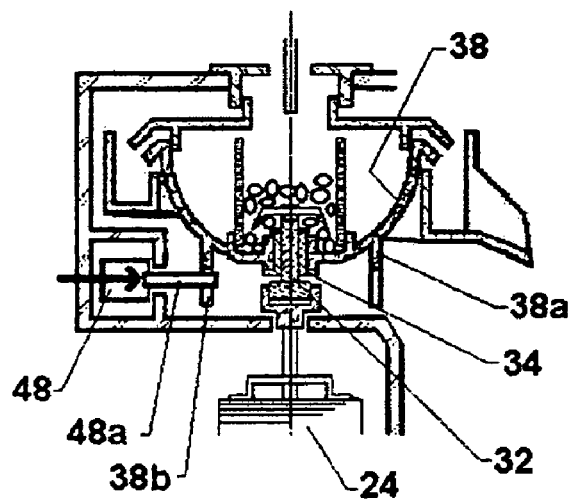
FIGS. 4a-4d illustrate the operational sequence of the milling and brewing stages.
Figure 4B:
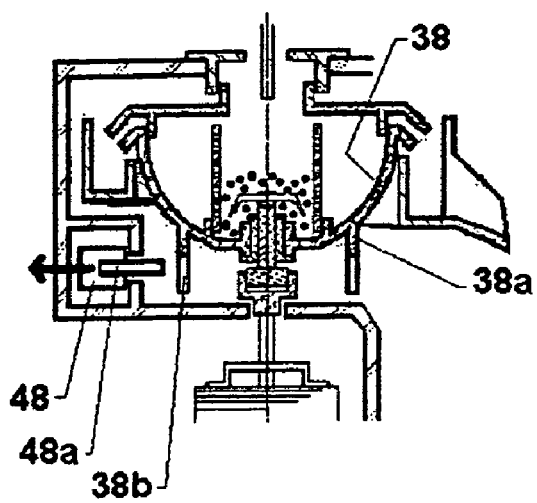

Once the engagement is achieved, a command is sent to the motor 24. The motor 24 is then powered to a speed of about 15,000 to about 25,000 rpm, preferably at about 20,000 rpm, to rotate the chopping blade 36 to mill the coffee beans inside the filter 42 for about 10 to about 60 seconds, depending on the size and amount of coffee beans (step 216). When the motor 24 stops, the pin 48a is pulled away from the slot 38b to unlock the brewing basket 38 (FIG. 4b; steps 218 and 220). The milling stage is completed at this time.

Figure 4C:
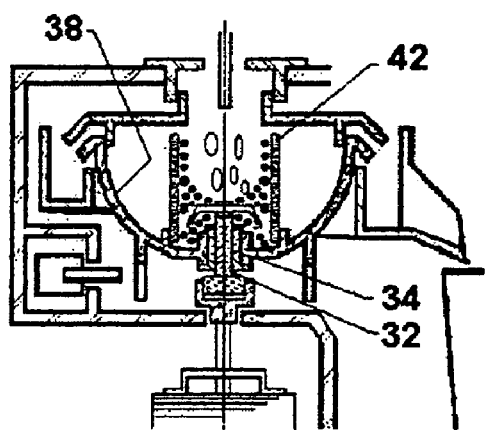

The brewing stage starts with the pumping of hot water from the reservoir 14 to the milled coffee powder inside the tubular filter 42 (FIG. 4c and step 222). After about 2 to about 5 seconds, the milled coffee powder is permeated with hot water and is ready to be brewed. The shaft 32 is then rotated to a speed of about 15,000 rpm to about 25,000 rpm by the motor 24. Preferably, the shaft 32 is rotated to a speed of about 20,000 rpm.

The frictional forces generated on the bushing 34 drives the brewing basket 38 to rotate (step 224). The brewing basket 38 gradually picks up the rotational speed of the shaft 32. After 10 seconds to about 30 seconds, preferably about 20 seconds, the brewing basket 38 keep picking up the speed until it becomes steady to about 8,000 rpm to about 12,000 rpm, preferably 10,000 rpm. Generally, the final rotational speed of the brewing basket 38 depends on the rotational speed of the shaft 32. The faster the shaft 32 rotates, the faster the brewing basket 38 rotates.

Figure 4D:
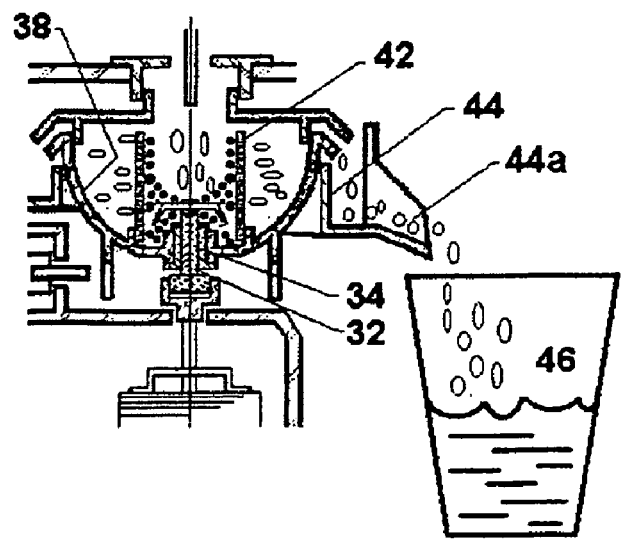

As the speed of the bushing 34 and the brewing basket 38 increases, the wetted milled coffee powder begins to climb up to the inner wall of filter 42 as shown in FIG. 4c. When the speed of the brewing basket 38 reaches about 5,000 to about 8,000 rpm, preferably about 6,000 rpm, centrifugal forces are generated and the centrifugal brewing begins (FIG. 4d and step 226). The centrifugal forces are adequate to drive the hot water through the milled coffee powder to extract the favor of milled coffee powder. Since the hot water flows through the milled coffee powder very promptly, only essential fragrant ingredients of the milled coffee powder are extracted and those degrading the flavor are not extracted, thereby improving the flavor of the brewed coffee. The brewed coffee is further pushed throughout the filter 42 and hits the sidewall of the brewing basket 38. The centrifugal force keeps driving brewed coffee up to the top of the brewing basket 38 until it is spun out of the basket 38 into the collector tray 44. In the collector tray 44, brewed coffee is diverted towards the spout 44a and drained into the receiver 46. The centrifugal brewing is maintained for about 40 seconds to about 120 seconds, depends on the size and amount of milled coffee powder. Finally, the motor stops and the brewing stage is finished (step 228).

In addition, the control panel can allow the user to activate either the milling stage or the brewing stage by press the "Mill" button or the "Brew" button, respectively. The user can select just the brewing stage by omitting the milling stage if ready-made coffee powder (rather than coffee beans) is used. The user can also select just the milling stage by omitting the brewing stage if he or she wants to mill the coffee beans more than one time before brewing.

The control panel as shown in FIG. 3a also allows the user to choose the number of cups of brewed coffee to be served. For example, if two cups of brewed coffee are to be made, about 300 ml of water and about 10 g to about 12 g of coffee beans are needed; if four cups of brewed coffee are to be made, about 600 ml of water and about 20 g to about 24 g of coffee beans are needed.

Figure 5:
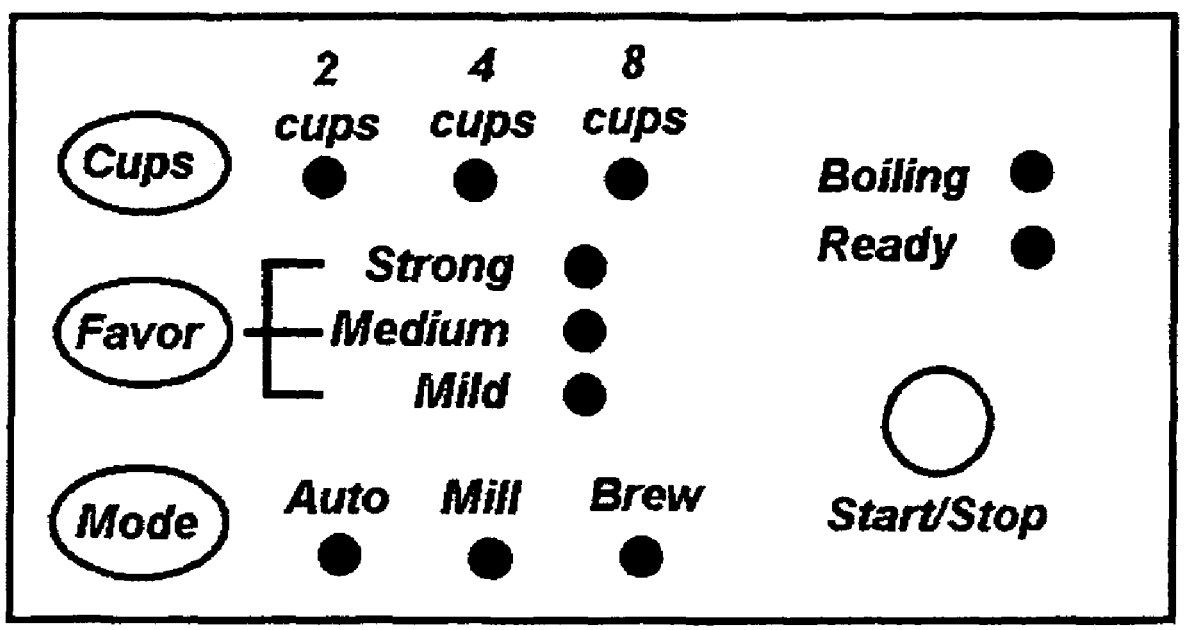
FIG. 5 shows another control panel of the coffee maker of FIG. 1a or FIG. 2.

Referring now to FIG. 5, another control panel of the coffee maker is shown. Using this control panel, in addition to achieving the functions of the control panel shown in FIG. 3a, different flavors of coffee (e.g., strong, medium, mild, etc.) can be brewed. There are three different approaches which can be used to control the flavors of the brewed coffee.

The first approach is to control the grain size of coffee powder during the milling stage. The different durations of the milling stage lead to the different grain sizes of the milled coffee powder. The longer the duration of the milling stage lasts, the smaller the grain size of coffee powder is milled. When brewing with the same amount of coffee beans and hot water during the same period of time, different grain sizes of milled coffee powder generate different flavors of brewed coffee. Particularly, larger grain sizes of the milled coffee powder can be brewed to mild coffee, while smaller grain sizes of the milled coffee powder can be brewed to strong coffee. By setting up the controller (e.g., programming the microprocessor) of the coffee maker with different durations of the milling stage, the blade of the coffee maker can mill different grain sizes of coffee powder. As a result, different flavors of coffee can be brewed.

Figure 6:
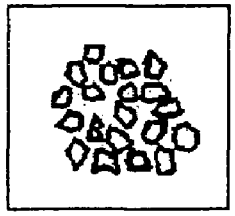
FIG. 6 is a chat showing how the grain size of milled coffee powder affects the flavor of brewed coffee.
Figure 6:
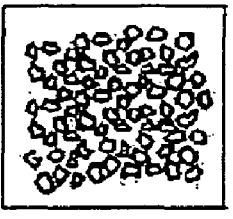
Figure 6:
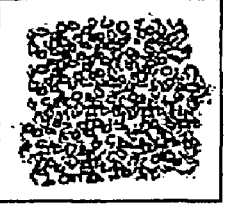
Figure 6:
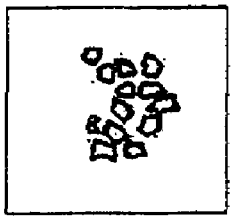
Figure 6:
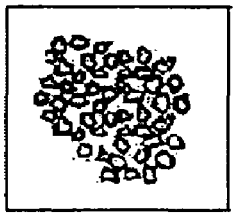
Figure 6:
Figure 6:
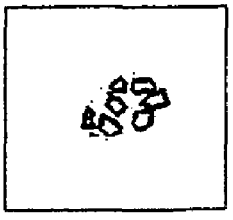
Figure 6:
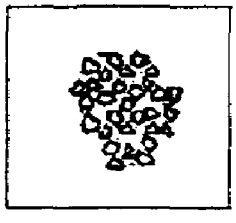
Figure 6:
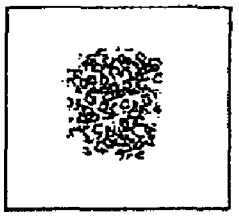

Referring to the example shown in FIG. 6, if the user wants to brew two cups of coffee, about 10-12 g coffee beans and about 300 ml water are needed. If mild flavor is chosen, the milling time is generally set to about 20 seconds. If medium flavor is chosen, the milling time is generally set to about 35 seconds. If strong flavor is chosen, the milling time is generally set to about 55 seconds.

The second approach is to control the speed of water penetration through the milled coffee powder. When brewing with the same amount of coffee beans and water using the same grain size of milled coffee powder, different water penetration speeds through the milled coffee powder generate different flavors of brewed coffee. The longer the hot water stays with the milled coffee powder, the stronger flavor of coffee is brewed. The water penetration speed depends on the rotational speed of the brewing basket. The faster the brewing basket rotates, the faster the hot water penetrates through the milled coffee powder. As a result, mild flavor coffee is brewed. On the contrary, the slower the brewing basket rotates, the slower the hot water penetrates through the milled coffee powder. As a result, strong flavor coffee is brewed. By setting up the controller (e.g., programming the microprocessor) of the coffee maker with different rotational speeds of the brewing basket, different speeds of water penetration can be achieved. As a result, different flavors of coffee can be brewed.

The third approach is the combination of the first and second approaches. By setting up different combination of milling durations and rotational speeds of the brewing basket, different flavors of coffee can be brewed.

While the present invention has been shown and described with particular references to a number of preferred embodiments thereof, it should be noted that various other changes or modifications may be made without departing from the scope of the present invention.

What is claimed is:

1. A coffee maker with combined milling stage and brewing stage, comprising:
   (a) a rotational brewing basket for receiving coffee beans and hot water, the rotational brewing basket adapted to rotate about a longitudinal axis and comprising a sleeve extending along a portion of the longitudinal axis;
   (b) a chopping blade provided inside the brewing basket;
   (c) a locking mechanism for selectively suppressing rotation of the rotational brewing basket;
   (d) a rotational shaft connected to the chopping blade for rotating the chopping blade to mill the coffee beans into milled coffee powder, the rotational shaft rotatably fitted within the sleeve of the rotational brewing basket and adapted to rotate about the longitudinal axis;
   (e) a motor for providing a rotational force to the rotational shaft; and
   wherein only the shaft rotates about the longitudinal axis to mill the coffee beans when the rotation of the brewing basket is suppressed by the locking mechanism; and
   wherein when the rotation of the brewing basket is not suppressed by the locking mechanism, rotation of the shaft generates frictional forces inside the sleeve of the rotational brewing basket, the frictional forces drive the brewing basket to rotate about the longitudinal axis, and the rotation of the brewing basket generates a centrifugal force to cause the hot water inside the brewing basket to penetrate the milled coffee powder to produce brewed coffee.

2. The coffee maker of claim 1 further comprising a filter positioned within the rotational brewing basket, the filter defining therein a chamber enclosing the chopping blade and adapted to receive the coffee beans.

3. The coffee maker of claim 1 wherein a side wall of the rotational brewing basket comprises an outer filter.

4. The coffee maker of claim 3 further comprising an inner filter positioned in a concentric relationship with the outer filter.

5. The coffee maker of claim 4 wherein the inner filter comprises a layer of plate with a plurality of apertures and the outer filter comprises a layer of wire mesh.

6. The coffee maker of claim 1 further comprising at least a bushing positioned between the sleeve of the rotational brewing basket and the rotational shaft.

7. The coffee maker of claim 1 wherein the rotational brewing basket comprises a downwardly tapered inner surface.

8. The coffee maker of claim 1 further comprising a controller adapted to command the locking mechanism to suppress the rotation of the brewing basket during the milling stage and to un-suppress the rotation of the brewing basket during the brewing stage.

9. The coffee maker of claim 1 further comprising a controller adapted to control duration of the milling stage to produce different grain sizes of the milled coffee powder to make the brewed coffee with different flavors.

10. The coffee maker of claim 1 further comprising a controller adapted to control rotational speed of the brewing basket during the brewing stage to attain different water penetration speeds through the milled coffee powder to make the brewed coffee with different flavors.

11. A coffee maker with combined milling stage and brewing stage, comprising:
(a) a rotational brewing basket for receiving coffee beans and hot water, the rotational brewing basket adapted to rotate about a longitudinal axis and comprising a sleeve extending along a portion of the longitudinal axis;
(b) a chopping blade provided inside the brewing basket;
(c) a rotational shaft connected to the chopping blade for rotating the chopping blade to mill the coffee beans into milled coffee powder, the rotational shaft rotatably fitted within the sleeve of the rotational brewing basket and adapted to rotate about the longitudinal axis; and
wherein only the shaft rotates about the longitudinal axis to mill the coffee beans during the milling stage; and
wherein, during the brewing stage, rotation of the shaft generates frictional forces inside the sleeve of the rotational brewing basket, the frictional forces drive the brewing basket to rotate about the longitudinal axis, and rotation of the brewing basket generates a centrifugal force to cause the hot water inside the brewing basket to penetrate the milled coffee powder to produce brewed coffee.

12. The coffee maker of claim 11 further comprising a filter positioned within the rotational brewing basket, the filter defining therein a chamber enclosing the chopping blade and adapted to receive the coffee beans.

13. The coffee maker of claim 11 wherein a side wall of the rotational brewing basket comprises an outer filter.

14. The coffee maker of claim 13 further comprising an inner filter positioned in a concentric relationship with the outer filter.

15. The coffee maker of claim 14 wherein the inner filter comprises a layer of plate with a plurality of apertures and the outer filter comprises a layer of wire mesh.

16. The coffee maker of claim 11 farther comprising at least a bushing positioned between the sleeve of the rotational brewing basket and the rotational shaft.

17. The coffee maker of claim 11 wherein the rotational brewing basket does not rotate during the milling stage and the rotational brewing basket rotates during the brewing stage.

18. The coffee maker of claim 11 further comprising a controller adapted to control duration of the milling stage to produce different grain sizes of the milled coffee powder to make the brewed coffee with different flavors.

19. The coffee maker of claim 11 further comprising a controller adapted to control rotational speed of the brewing basket during the brewing stage to attain different water penetration speeds through the milled coffee powder to make the brewed coffee with different flavors.

20. A coffee maker with combined milling stage and brewing stage, comprising:
(a) a rotational brewing basket for receiving coffee beans and hot water, the rotational brewing basket adapted to rotate about a longitudinal axis and comprising a sleeve extending along a portion of the longitudinal axis;
(b) a chopping blade provided inside the brewing basket;
(c) a locking mechanism for selectively suppressing rotation of the rotational brewing basket;
(d) a rotational shaft connected to the chopping blade for rotating the chopping blade to mill the coffee beans into milled coffee powder, the rotational shaft rotatably fitted within the sleeve of the rotational brewing basket and adapted to rotate about the longitudinal axis, wherein only the shaft rotates about the longitudinal axis to mill the coffee beans when the rotation of the brewing basket is suppressed by the locking mechanism, and wherein when the rotation of the brewing basket is not suppressed by the locking mechanism, rotation of the shaft generates frictional forces inside the sleeve of the rotational brewing basket, the frictional forces drive the brewing basket to rotate about the longitudinal axis, and the rotation of the brewing basket generates a centrifugal force to cause the hot water inside the brewing basket to penetrate the milled coffee power to produce brewed coffee;
(e) a filter for filtering the brewed coffee;
(f) a motor for providing a rotational force to the rotational shaft; and
(g) a controller adapted to control sequence of the milling stage and the brewing stage.

* * * * *